United States Patent [19]

Leonardo

[11] 4,455,716
[45] Jun. 26, 1984

[54] TAP BRACKET OR THE LIKE

[75] Inventor: Ignazio Leonardo, Mountainside, N.J.

[73] Assignee: Diamond Communication Products, Inc., Garwood, N.J.

[21] Appl. No.: 390,913

[22] Filed: Jun. 22, 1982

[51] Int. Cl.[3] .......................................... F16G 11/00
[52] U.S. Cl. ................................ 24/115 A; 24/135 N; 24/569; 24/703; 248/61; 248/74.2
[58] Field of Search ............ 24/115 R, 115 A, 115 G, 24/115 H, 129 R, 129 B, 135 R, 135 A, 135 K, 135 L, 135 N, 243 B, 248 SA, 259 R; 248/61, 63, 62, 74 A, 74 B

[56] References Cited

U.S. PATENT DOCUMENTS

| | | | |
|---|---|---|---|
| 231,319 | 8/1880 | Holbrook | 24/135 N |
| 2,504,360 | 4/1950 | Van Auken | 248/61 |
| 3,154,279 | 10/1964 | Fletcher et al. | 248/61 |
| 3,160,378 | 12/1964 | Goewey | 248/61 |
| 3,177,542 | 4/1965 | James | 24/243 |
| 3,273,417 | 9/1966 | Sevrence | 24/129 B |
| 3,848,839 | 11/1974 | Tillman | 248/62 |

Primary Examiner—Gene Mancene
Assistant Examiner—Kris R. Schulze
Attorney, Agent, or Firm—Hopgood, Calimafde, Kalil, Blaustein & Judlowe

[57] ABSTRACT

The invention contemplates a unitary cable-clamp fitting adapted for equipment or other connection to an overhead-suspension cable or messenger wire. The fitting comprises two side panels integrally connected by a single bend establishing an initially acute angle between the side panels. In a preferred form, the outer edge of each panel is characterized by an elongate flange bent inward and generally toward the opposite side panel, and the initial space between flanges is slightly less than the cable diameter to be accommodated, so that cable assembly and loose retention are achieved via snap-action insertion between the flanges. A nut and bolt, loosely engaged via aligned openings in the panels, is tightened to set the clamp to the cable. Bracket hardware having a mounting opening may be clamped with the same nut and bolt, and the bolt itself may be formed for simple accessory or guy-wire connection.

6 Claims, 3 Drawing Figures

TAP BRACKET OR THE LIKE

BACKGROUND OF THE INVENTION

The invention relates to a clamp construction for application to a cable, as to a messenger wire for overhead suspension of CATV or telephone cabling and associated tap devices.

Existing devices of the character indicated, i.e., for messenger-wire suspension, along with CATV or telephone cabling, involve multiple parts, namely, separate jaw members which are initially loosely connected by a single nut-and-bolt fastener via apertures in the separate jaw members. And where a tap or other equipment suspension is required, a separate suitably formed bracket member is apertured at its upper end, for assembled retention by the clamp fastener, to be clamped by the fastener when the fastener is driven to squeeze the jaws to the messenger wire. Necessarily, multiple parts in loosely retained relation via a single unset nut-and-bolt fastener are clumsy and awkward to handle, especially when consideration is given to the precarious elevated ladder or other support required for installation or maintenance personnel to use such parts.

BRIEF STATEMENT OF THE INVENTION

It is an object of the invention to provide improved clamp structure of the character indicated.

It is a specific object to provide such clamp structure of integral one-piece nature, aside from a single nut-and-bolt fastener to secure the same.

Another specific object is to provide such clamp structure with inherent capability of initial snap-on assembly to a messenger wire or the like, involving a one-hand operation and resulting in self-retention of the clamp structure on the wire, even though the fastener has not yet been set.

A further specific object is to embody tap-bracket structure as a selectively combinable part of the clamp structure.

It is a general object to meet the above objects with more simple, less expensive, and more readily usable structure than heretofore.

The invention achieves the foregoing objects in a unitary cable-clamp fitting adapted for equipment or other connection to an overhead-suspension cable or messenger wire. The fitting comprises two side panels integrally connected by a single bend establishing an initially acute angle between the side panels. In a preferred form, the outer edge of each panel is characterized by an elongate flange bent inward and generally toward the opposite side panel, and the initial space between flanges is slightly less than the cable diameter to be accommodated, so that cable assembly and loose retention are achieved via snap-action insertion between the flanges. A nut and bolt, loosely engaged via aligned openings in the panels, is tightened to set the clamp to the cable. Bracket hardware having a mounting opening may be clamped with the same nut and bolt, and the bolt itself may be formed for simple accessory or guy-wire connection.

DETAILED DESCRIPTION

The invention will be described in detail in connection with the accompanying drawings, in which:

FIG. 1 is a perspective view of a clamp of the invention with associated tap-bracket structures, in loosely assembled relation, prior to assembly to a messenger wire or the like;

FIG. 2 is a similar view of the structure of FIG. 1 clamped to a messenger wire or the like.

Figure 1:
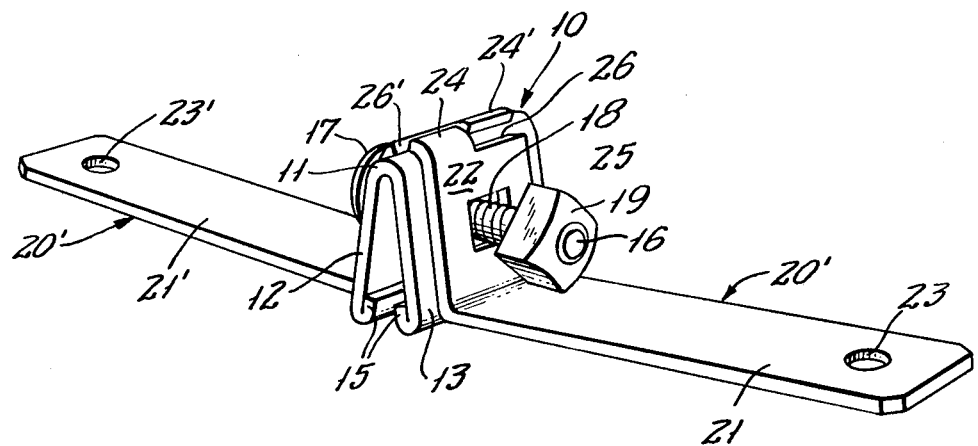
Figure 2:
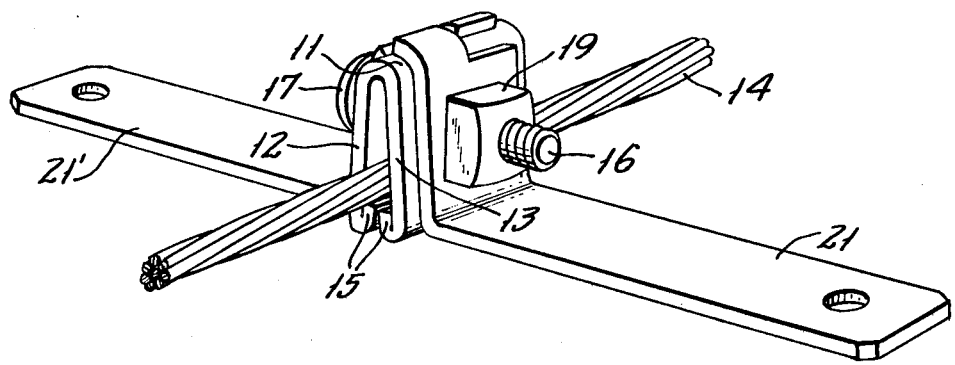

The article of FIGS. 1 and 2 comprises a single-piece clamp and selectively combined tap-bracket hardware, loosely retained to the clamp. The clamp has a body 10 integrally formed from a strip or strap of stiff metal such as steel, preferably galvanized for environmental protection. The body strip may be of uniform width and thickness and, as shown, is characterized by a central bend 11, dividing the body into two like side panels 12-13 which diverge in the direction away from bend 11. The expression "longitudinal" will be adopted herein to express the direction of bend 11, inasmuch as when applied to messenger wire 14, bend 11 extends parallel to and therefore in the longitudinal direction of the messenger wire 14.

The outer ends of the respective side panels 12-13 are characterized by inwardly bent flanges 15 which, in their initially formed state, are spaced from each other by slightly less than the diameter of the messenger wire. Preferably, as thus formed, both flanges 15 lie flat against their respective panels 12-13. Aligned apertures, one in each panel, are sized to receive the shank of a clamp bolt 16. Preferably, bolt 16 is a carriage bolt, i.e., having a square key formation between the bolt head 17 and the threaded part of the bolt shank, and the aligned apertures are each of square contour, for anti-rotational engagement of the head end of the bolt shank; such contour is visible in FIG. 1 for the aperture 18 of panel 13. A nut 19 is initially loosely assembled to bolt 16.

The structure thus far described, i.e., taken alone, i.e., with nut and bolt (16-19) loosely assembled to body 10, will be seen to be conveniently capable of assembly to messenger wire 14, in a simple one-handed operation, requiring merely snap-engagement of wire 14 past a compliant throat region between flanges 15. Once thus snap-engaged, wire 14 remains trapped between flanges 15 and the shank of bolt 16, it being understood that sufficient offset is available between flanges 15 and bolt 16 to assure such an engagement. This snap-engaged relation is self-retaining, so that the installer has both hands free until he is ready to set the clamp, again with a one-handed operation; because the bolt is keyed against rotation, only a wrenching at nut 19 is needed, to draw panels together and tightly compressed against wire 14.

The arrangement of FIG. 1 is further illustrative of tap-bracket arm inclusion in the described loosely retained assembly. As shown, a tap bracket 20 comprises a strap or strip of stiff metal, which may be of the same thickness and width as that from which clamp body 10 is formed. Bracket 20 is seen as a straight arm 21 having a first upwardly bent foot 22 at one end and an equipment attaching aperture 23 at its other end. Foot 22 is flat and substantially coextensive with panel 13 to which it abuts, and foot 22 is substantially normal to arm 21. At its upper end 24, foot 22 is curved to fit adjacent convex curvature of the bend 11 and, thus fitted, a single preferably square keying aperture 25 therein is in register with the aperture 18 of panel 13. The curved upper end 24 is seen to be provided over substantially the left-offset half of the width (longitudinal extent) of foot 22 and to extend in its curvature preferably just past the central longitudinal plane of symmetry of bend 11. For the remaining half of its longitudinal extent, the end of foot 22 is cut away, the same being designated 26 in FIG. 1.

The described structure of bracket 20 will be seen to be applicable for the case of a second such bracket 20', fitted similarly to panel 12 and extending in the opposite direction from clamp body 10. Bracket 20' and its component parts are therefore given the same reference numbers as for bracket 20, but with primed notation.

As seen in FIG. 1, the combination of brackets 20–20' with clamp body 10 is loosely retained in unit-handling relation and is therefore readily adapted for one-handed snap-action initial application to wire 14. Thereafter, again in a one-handed operation, only a wrench need be used, in application to nut 19, to set the clamp and to retain both brackets 20–20' in securely fastened and correct alignment. The square key of bolt 17 engages the square openings of both bracket 20' and its adjacent panel 12, and the lapped axially adjacent regions of ends 24–24' abut to eliminate any tendency of bracket 20 to rotate in the course of tightening nut 19.

Figure 3:
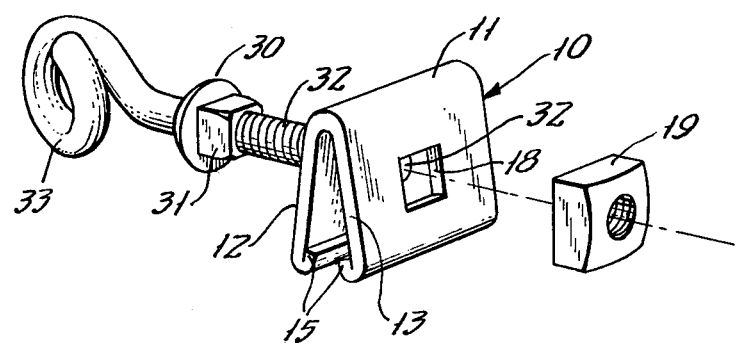
FIG. 3 is an exploded view in perspective, to show a modification.

FIG. 3 illustrates another context in which the snap-on fitting 10 finds useful application, particularly in an above-ground suspension-cable situation. In the arrangement of FIG. 3, the rod material used to form the bolt has been centrally upset to define a head or flange formation 30 and locally adjacent square key 31, on that side of flange 30 which defines the threaded shank 32 of the bolt. On the other side of flange 30, the rod material has been formed into a spiral hook 33 of preferably substantially $2\pi$ extent, enabling for example assembly of a guy wire or like connection to hook 33. Of course, the same one-handed facility exists for snap-action loosely retained assembly of the clamp body 10 (and its bolt 32 and nut 19) to a messenger wire, as well as for one-handed wrenching of nut 19 to squeeze the clamp to the messenger wire. A firm point is thus established, as for guy-wire connection to stabilize a given span of messenger wire.

The described embodiments will be seen to meet all stated objects. The constructions are inherently self-retaining when snapped onto the messenger wire, and sufficient torsional resistance characterizes the retention of all parts as to enable one-handed wrenching.

While the invention has been described in detail, it will be understood that modifications may be made without departure from the scope of the invention.

What is claimed is:

1. As an article of manufacture, a tap bracket or the like, comprising a cable clamp member for secure attachment to a selected location along a longitudinal stretch of messenger wire or the like of given diameter, and a single-piece bent stiff metal-strip bracket member loosely assembled by an engaged nut and bolt; said clamp member comprising two side panels of stiff metal strip integrally connected by a single upper-edge longitudinal bend and divergent downwardly at an acute angle to their lower longitudinal edges, at least one of said side panels having at its lower longitudinal edge a reversely and inwardly and upwardly bent flange of upward extent less than the upward extent of said one side panel and oriented at an acute angle to its associated side panel, the inner limiting edge of said flange being spaced from the nearest region of the other panel to an offset extent slightly less than said given diameter, whereby said clamp may be applied to the cable with snap action via the space at said offset, and said panels each having a bolt aperture at a bolt-shank alignment sufficiently offset from said flange to accommodate the cable between said flange and said bolt alignment, the upwardly bent edge of said flange being at sufficient offset beneath said bolt shank to accommodate said given diameter; said bracket member comprising an arm of stiff sheet metal having an integral upstanding flat leg at one end and a reversely bent hook formation at the end of said leg, the flat of said upstanding leg confronting the outer surface of one of said panels and the hook formation having curved and fitted conformance to the convex curvature outside the bend between said panels, and said upstanding leg having a bolt aperture in register with the bolt aperture of said one side panel, the shank of said bolt passing through all of said apertures, whereby upon setting the nut and bolt to clamp to the cable, the tap-bracket arm is fixed to the clamp and keyed against rotation by reason of the fit of said hook formation to said bend.

2. The article of claim 1, in which said bracket member is one of two, each having a bolt aperture in register with the bolt aperture of a different one of said panels, and in which the bolt shank passes through all four apertures.

3. The article of claim 2, in which upon setting the nut and bolt and thus clamping to the cable, the bracket members establish clamped arms extending in opposite directions and substantially normal to the respective adjacent panels.

4. The fitting of claim 2, in which the hook formations of said tap-bracket arms are at transversely offset fractions of said arms such that the hook formations of both arms fit longitudinally spaced regions of said bend.

5. The article of claim 1, in which upon setting the nut and bolt and thus clamping to the cable, the bracket member establishes a clamped arm extending substantially normal to the plane of the adjacent panel.

6. The article of claim 1, in which said apertures are of square contour and said bolt has a key formation non-rotationally engaged at one of said apertures.

* * * * *